(12) United States Patent
Kitayama et al.

(10) Patent No.: US 8,305,869 B2
(45) Date of Patent: Nov. 6, 2012

(54) OPTICAL DISC DRIVE

(75) Inventors: Akira Kitayama, Tachikawa (JP);
Toshimitsu Kaku, Sagamihara (JP);
Hajime Nishimura, Tokyo (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/153,491

(22) Filed: Jun. 6, 2011

(65) Prior Publication Data

US 2012/0044795 A1   Feb. 23, 2012

(30) Foreign Application Priority Data

Aug. 23, 2010   (JP) .................................. 2010-186324

(51) Int. Cl.
*G11B 7/00* (2006.01)
(52) U.S. Cl. ................................. 369/124.01
(58) Field of Classification Search ............. 369/124.01, 369/124.14, 44.41, 44.12, 100
See application file for complete search history.

(56) References Cited

U.S. PATENT DOCUMENTS

| | | | |
|---|---|---|---|
| 2005/0025031 A1* | 2/2005 | Kodama et al. | 369/116 |
| 2005/0232102 A1* | 10/2005 | Chou et al. | 369/47.5 |
| 2006/0062101 A1* | 3/2006 | Negishi et al. | 369/44.11 |
| 2009/0040902 A1* | 2/2009 | Kamel et al. | 369/100 |
| 2009/0052492 A1* | 2/2009 | Senga et al. | 372/50.121 |
| 2009/0103406 A1 | 4/2009 | Kitayama et al. | |
| 2010/0149949 A1* | 6/2010 | Senga et al. | 369/112.01 |
| 2010/0260029 A1* | 10/2010 | Kurihara et al. | 369/100 |
| 2010/0290331 A1* | 11/2010 | Kaizaki et al. | 369/100 |

FOREIGN PATENT DOCUMENTS

| | | |
|---|---|---|
| JP | 2001-84624 A | 3/2001 |
| JP | 2006-24341 A | 1/2006 |
| JP | 2009-99233 A | 5/2009 |

* cited by examiner

*Primary Examiner* — Thang Tran
(74) *Attorney, Agent, or Firm* — Crowell & Moring LLP

(57) ABSTRACT

Bandwidth is secured for a read signal transmission line by matching the characteristic impedance of the read signal transmission line with the output impedance of a photodetector of an optical pick up, while at the same time securing bandwidth for the photodetector. In an optical disc drive according to an embodiment of the present invention, each line forming a differential transmission line is divided into a plurality of lines of the same quantity, the quantity being two or more, at or near a connection point between a flexible line and the optical pick up.

9 Claims, 13 Drawing Sheets

OPTICAL DISC DRIVE

CLAIM OF PRIORITY

The present application claims priority from Japanese patent application JP 2010-186324 filed on Aug. 23, 2010, the content of which is hereby incorporated by reference into this application.

BACKGROUND OF THE INVENTION

1. Field of the Invention

The present invention relates to optical disc drives.

2. Background Art

Capabilities to read and write signals faster with respect to large-capacity optical discs, as represented by Blu-ray (registered trademark) discs, are being demanded of today's optical disc drives. In order to read and write at high speeds, it is preferable that transmission lines be shortened to reduce transmission loss.

On the other hand, flexible lines are used for a large part of read/write signal transmission lines in optical disc drives in order to make the optical pick up movable. Consequently, due to a need to secure a given range of motion, transmission lines physically require a certain length. In addition, flexible lines are used in thin-type optical disc drives used for laptop personal computers and the like in order to enable opening/closing of the disc tray. Such lines also physically require a certain length.

For such reasons, read/write transmission lines of optical disc drives are characterized by the long distance between the signal processing LSI (Large Scale Integration), which processes read/write signals, and the optical pick up. When a read/write transmission line is long, not only does the insertion loss for the transmission line increase, but the effects of reflection at parts with impedance mismatches also bear on lower frequencies. Consequently, waveform degradations are caused in read/write signals, examples of which may include waveform ringing, slower rise/fall times, etc. The effects thereof become more pronounced as the read/write speed is further increased, potentially worsening error rates for reading/writing.

JP Patent Publication (Kokai) No. 2001-84624 A (Patent Document 1), JP Patent Publication (Kokai) No. 2006-24341 A (Patent Document 2), and JP Patent Publication (Kokai) No. 2009-99233 A (Patent Document 3) disclose methods of compensating for such read/write errors.

SUMMARY OF THE INVENTION

Due to bandwidth constraints of the optical pick up's photodetector itself, or to impedance mismatches between photodetectors and signal transmission lines, bandwidth margins for realizing high-speed reading have decreased for read signal transmission systems of optical disc drives. Problems with read signal transmission systems of optical disc drives are discussed below.

A read signal outputted by an optical pick up is generally transmitted to a signal processing LSI using differential signal transmission, which is resistant to extraneous noise. In order to transmit the read signal to the signal processing LSI without degradation, the sum of the bandwidth of the read photodetector (Opto-Electronic Integrated Circuit: OEIC) that the optical pick up is equipped with, the bandwidth of the differential transmission line, and the bandwidth of the signal processing LSI must be equal to or greater than the bandwidth of the read signal.

When there are parts with impedance mismatches between the differential transmission line and elements located therebefore or thereafter, or within elements, multiple reflection of a signal occurs, which may cause waveform ringing and degradation in signal rise/fall time. Therefore, in order to secure a bandwidth equal to or greater than that of the read signal to realize high-speed signal transmission, impedances must be matched between the differential transmission line and elements therebefore and thereafter.

In order to secure driving force and signal bandwidth, the OEIC is designed in such a manner as to make the output impedance during differential transmission as low as possible. In so doing, in terms of the specifications of the optical disc drive, the output impedance of the OEIC tends to be lower than the characteristic impedance of the differential transmission line. Consequently, at the input end of the differential transmission line, there arises a mismatch between the characteristic impedance of the differential transmission line and the output impedance of the OEIC, thereby causing waveform degradation as discussed above. As such, the characteristic impedance of the differential transmission line and the output impedance of the OEIC need to be matched with each other.

In order to match the characteristic impedance of the differential transmission line and the output impedance of the OEIC, it is necessary to lower the characteristic impedance of the differential transmission line, or to raise the output impedance of the OEIC. Of the above, since the differential transmission line of the optical disc drive is in most part a flexible line, the characteristic impedance of the flexible line would appear dominant near the read signal frequency. Therefore, by way of example, in the case of a flexible flat cable, which is often used as a flexible line, since the configuration is simple, where a plurality of lead wires with a fixed line width and line pitch are respectively covered with an insulator, it would be difficult to adjust the characteristic impedance line by line.

On the other hand, when the above-mentioned flexible line is configured with a flexible printed circuit, the characteristic impedance of the differential transmission line is mostly determined by the respective dimensions and the parameters of the material. However, given that ductility and flexibility must be secured for the lines and, further, that approximately 50 to 100 transmission lines are usually arranged in the flexible line of an optical disc drive, the above-mentioned parameters have little freedom.

In contrast, in order to secure driving force and bandwidth for the OEIC, raising the output impedance of the OEIC is undesirable. Thus, it may be said that there is a tradeoff between the driving force and bandwidth of the OEIC and the bandwidth of the read signal transmission system.

The present invention is made in view of such problems, and one aspect thereof is to secure bandwidth for the photodetector of the optical pick up, while at the same time securing bandwidth for the read signal transmission line by matching the characteristic impedance of the read signal transmission line with the output impedance of the photodetector.

In an optical disc drive according to an embodiment of the present invention, each line forming a differential transmission line is divided into a plurality of lines of the same quantity, the quantity being two or more, at or near a connection point between a flexible line and an optical pick up.

With an optical disc drive according to an embodiment of the present invention, by dividing a differential transmission line, it is possible to adjust the characteristic impedance thereof. Specifically, it is possible to secure bandwidth by lowering the output impedance of a photodetector, while at the same time matching impedances by lowering the characteristic impedance of the differential transmission line in accordance with that output impedance. It is thus possible to realise high speed signal transmission while securing bandwidth for the photodetector.

DETAILED DESCRIPTION OF PREFERRED EMBODIMENTS

<Conventional Optical Disc Drive>

To facilitate a better understanding of the present invention, a signal transmission line of a conventional optical disc drive as well as peripheral configurations thereof will first be described before describing embodiments of the present invention. Embodiments of the present invention will thereafter be described.

Figure 1:
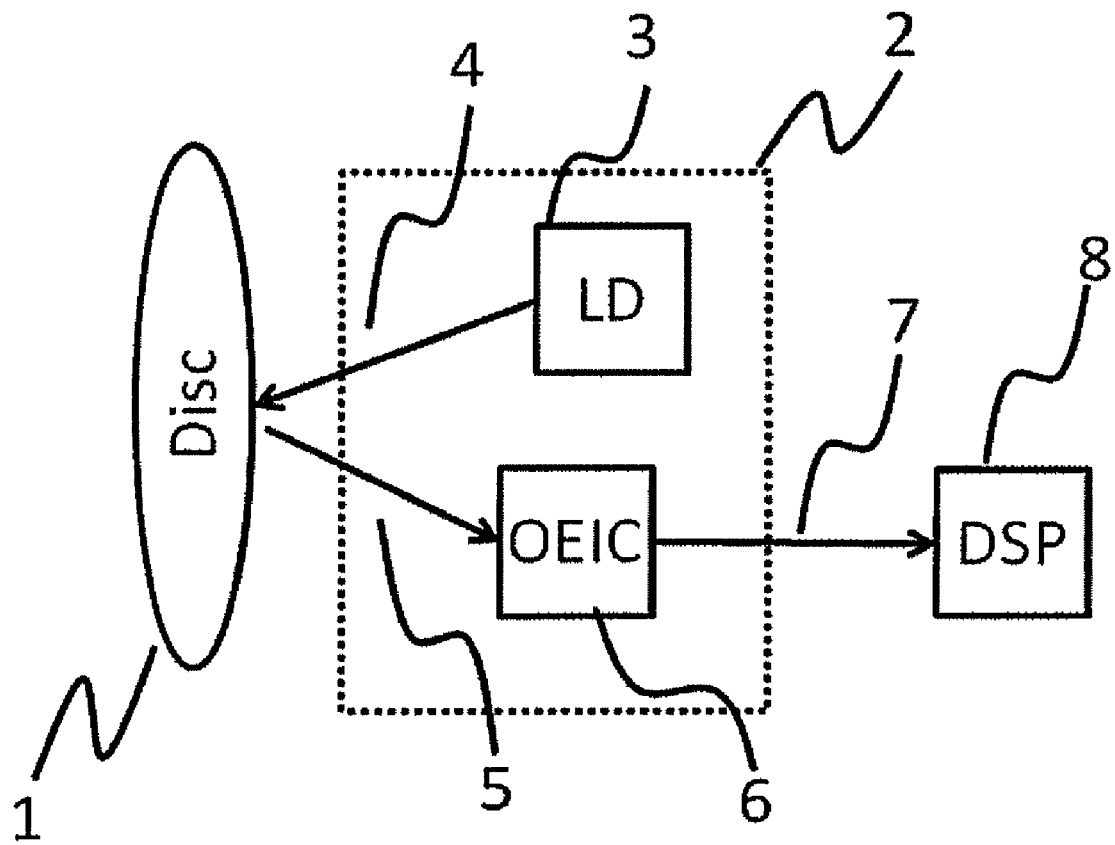
FIG. 1 shows a common read signal transmission system of an optical disc drive.

FIG. 1 shows a common read signal transmission system of an optical disc drive. It is noted that in all of the drawings indicated hereinbelow, wires and elements that are not directly relevant to the present invention have been omitted. General operations of each element shown in FIG. 1 are described below.

A semiconductor laser diode (LD) 3 mounted within an optical pick up 2 irradiates an optical disc 1 with a laser beam 4. A read photodetector (OEIC) 6 within the optical pick up 2 photoelectrically converts a reflected beam (read optical signal 5) whose intensity varies in accordance with the mark/space data recorded on the optical disc 1. A signal processing LSI 8 (which in this case is configured using a digital signal processor (DSP)) processes the read optical signal 5 that has been converted into an electrical signal, that is, a read signal 7, and reads the information on the optical disc 1.

Elements, and the transmission characteristics thereof, of the read signal transmission line from the OEIC 6 up to the signal processing LSI 8 vary depending on the type of the optical disc drive. A description is provided below with respect to a common transmission system for a half-height type optical disc drive for which the increase in reading speed has been particularly pronounced.

Figure 2:
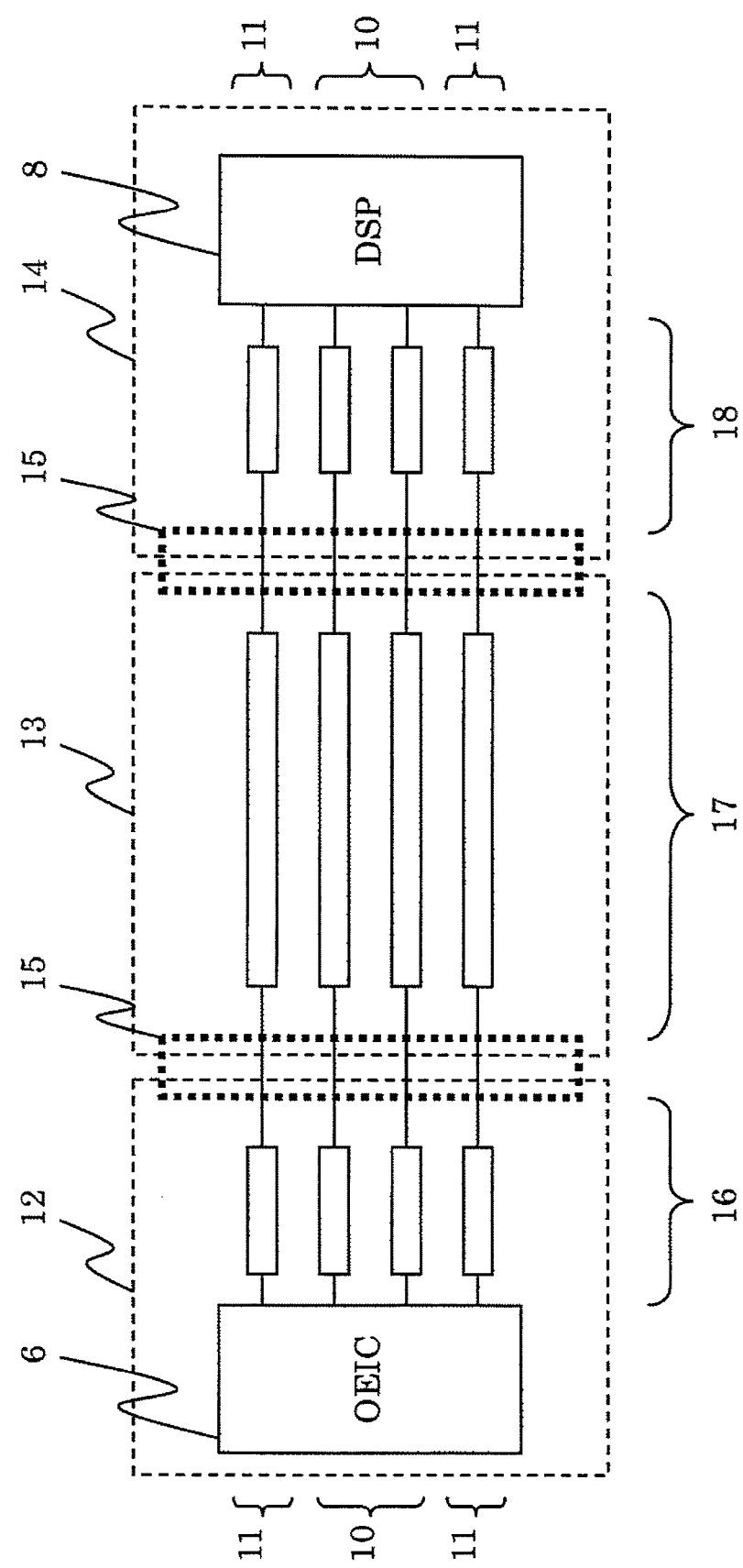
FIG. 2 is a diagram showing the configuration of a read signal transmission line from an OEIC 6 up to a signal processing LSI 8.

FIG. 2 is a diagram showing the configuration of the read signal transmission line from the OEIC 6 up to the signal processing LSI 8. The read signal 7 in FIG. 1 is transmitted from the OEIC 6 to the signal processing LSI 8 via differential transmission lines 10. For the purpose of noise suppression, guard lines 11, such as power wires, GND wires, etc., are often provided adjacent to the differential transmission lines 10 on their outer sides. The outermost two of the four lines in FIG. 2 correspond to such guard lines 11.

The differential transmission lines 10 are connected to a first circuit board 12, a flexible flat cable 13, a second circuit board 14, and connectors 15 that connect the above. The first circuit board 12 is a circuit board within the optical pick up 2 and on which the OEIC 6 is mounted. The second circuit board 14 is a circuit board on which the signal processing LSI 8 is mounted. The differential transmission lines 10 are divided, along the transmission direction, into lines 16 on the first circuit board 12, lines 17 on the flexible flat cable 13, and lines 18 on the second circuit board 14.

In order to secure some range of motion for the optical pick up, the flexible flat cable 13 requires a length of approximately 5 to 10 cm, which accounts for half or more of the entire length of the differential transmission lines 10. Thus, the characteristic impedance of the flexible flat cable 13 is dominant with respect to the average characteristic impedance of the differential transmission lines 10.

The flexible flat cable 13 is of a simple configuration wherein a plurality of lead wires of a fixed line width and line pitch are each covered with an insulator. It therefore costs less than flexible printed circuits, but adjusting its characteristic impedance line by line is difficult.

Assuming the configuration of a typical optical disc drive, the characteristic impedance of the flexible flat cable 13 having a line pitch of 0.5 mm would be approximately 130Ω during differential transmission. However, this is assuming that the flexible flat cable 13 is not in contact with any conductor, such as a housing, etc. Further, due to the thickness of the cover part for the flexible flat cable 13, the thickness of the lead wires, etc., the characteristic impedance during differential transmission takes on the range of approximately 100 to 140 Ω.

On the other hand, the output impedance of the OEIC 6 during differential transmission is designed to fall within the range of approximately 40 to 80Ω in order to secure driving force and bandwidth. As a result, there arises a mismatch between the output impedance of the OEIC 6 and the characteristic impedance of the differential transmission lines 10, and this causes waveform degradation.

Further, the present inventors have found through research that flexible printed circuits produced through processes commonly used for optical disc drives can only have their differential characteristic impedance adjusted within the range of approximately 80 to 160Ω. Further, flexible printed circuits are expensive relative to the flexible flat cable 13, and are therefore not readily employable when costs are considered.

In the description above, a half-height type optical disc drive has been discussed. However, it is speculated that similar problems would arise with thin-type optical disc drives used for laptop personal computers, etc., as well if their reading speed were to increase. Further, the characteristic impedance ranges for the various flexible lines indicated above would not be limited to those provided above if no limitations are placed on various parameters and conditions.

A signal transmission line of a conventional optical disc drive and its problems have been described above. Embodiments of the present invention will now be described below.

EMBODIMENT 1

Figure 3:
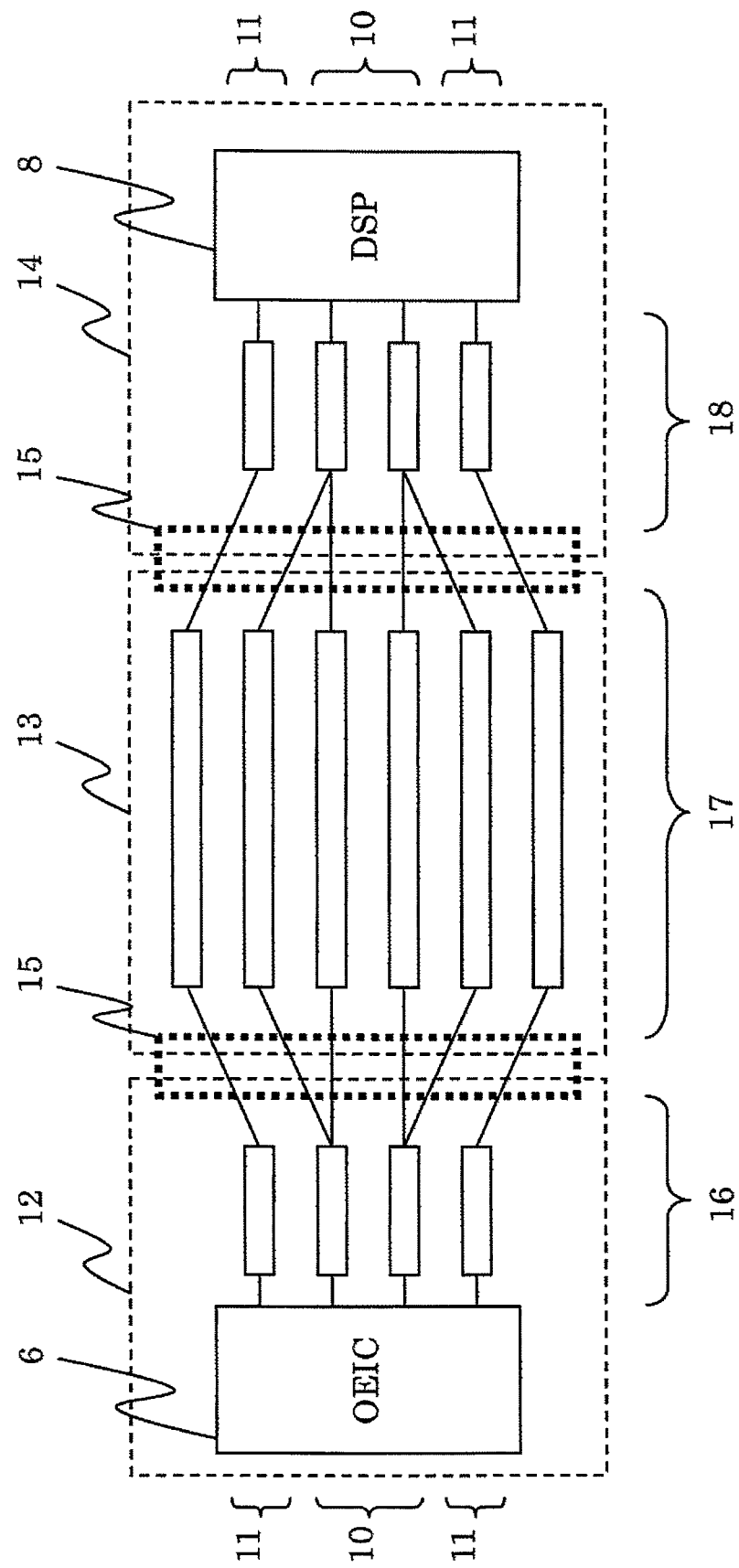
FIG. 3 is a configuration diagram of an optical disc drive according to Embodiment 1.

FIG. 3 is a configuration diagram of an optical disc drive according to Embodiment 1 of the present invention. Here, only the elements of a read signal transmission line that find correspondence in FIG. 2 are shown, and other general elements have been omitted.

In Embodiment 1, the two lines that form the differential transmission lines 10 are each further divided into two lines near the connection point between the first circuit board 12 and the flexible flat cable 13. Thus, at the lines 17 on the flexible flat cable 13, the differential transmission lines 10 are twice parallelized as compared to a conventional transmission line configuration. The divided lines are then re-integrated into one line near the connection point between the second circuit board 14 and the flexible flat cable 13.

With such a line configuration, as a result of the lines being parallelized at the section of the flexible flat cable 13 (i.e., at the lines 17), the inductance component of the differential transmission lines 10 per unit length decreases, and the capacitive coupling component between lines increases. Consequently, the characteristic impedance of the differential transmission lines 10 decreases as compared to that of a conventional line configuration. Further, since the area through which the electric current passes with respect to the differential transmission lines 10 also increases, conductor loss decreases. As a result of such effects, impedance matching between the OEIC 6 and the differential transmission lines 10 improves, and loss also decreases. Thus, it is speculated that waveform degradation would be mitigated and the bandwidth of the differential transmission lines 10 would improve.

EMBODIMENT 2

Figure 4:
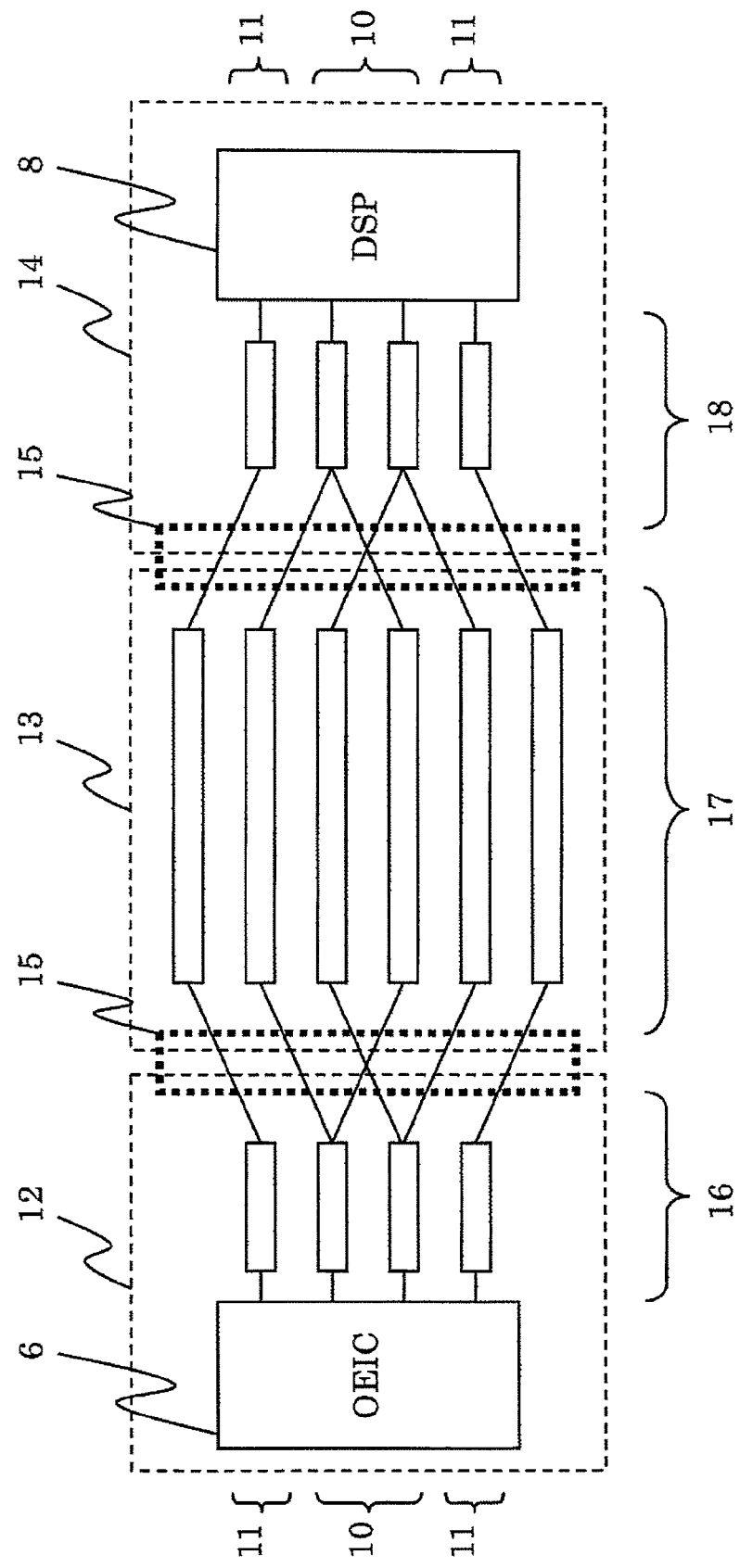
FIG. 4 is a configuration diagram of an optical disc drive according to Embodiment 2.

FIG. 4 is a configuration diagram of an optical disc drive according to Embodiment 2 of the present invention. As in FIG. 3, only the elements of a read signal transmission line are shown, and other general elements have been omitted.

In Embodiment 2, the two lines forming the differential transmission lines 10 are each divided into two lines near the connection point between the first circuit board 12 and the flexible flat cable 13 as in Embodiment 1. Embodiment 2, however, differs from Embodiment 1 in that the lines are arranged in such a manner that lines that transmit antiphase differential signals are alternatingly adjacent to one another.

Figure 5:
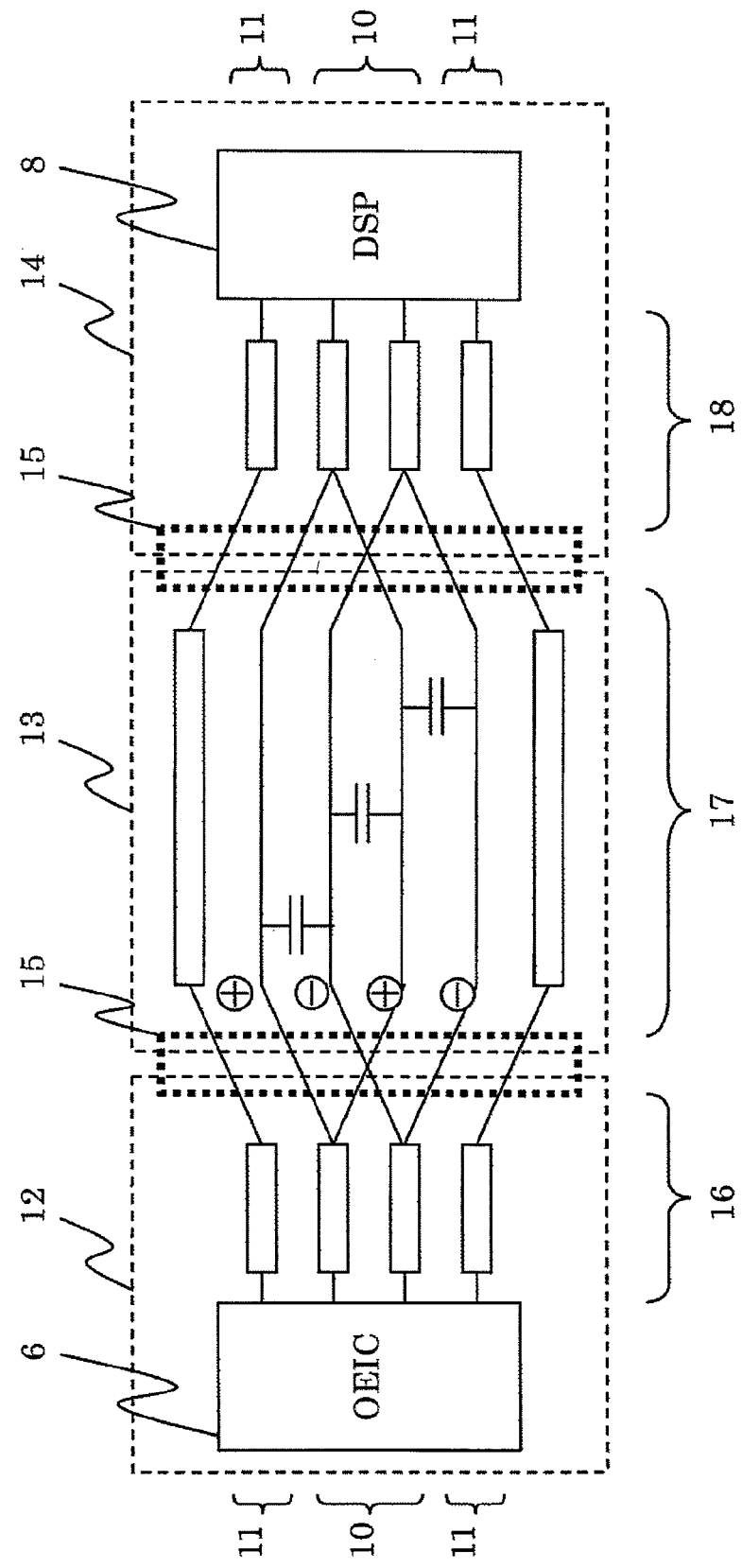
FIG. 5 is a diagram schematically showing an equivalent circuit for the line configuration shown in FIG. 4.

FIG. 5 is a diagram schematically showing an equivalent circuit for the line configuration shown in FIG. 4. For purposes of convenience, the circuit has been annotated with + and − signs to indicate the fact that the differential signals are of opposite phases.

As shown in FIGS. 4 and 5, when lines that transmit antiphase differential signals are alternatingly arranged, this results in there being three sections where antiphase lines are adjacent to each other. Consequently, there also exist three capacitive couplings among the lines. As a result, as compared to Embodiment 1, the capacitive coupling component of the flexible flat cable 13 increases, and the characteristic impedance of the differential transmission lines 10 further decreases.

Effects of Embodiments 1 and 2

Next, in order to confirm the effects of Embodiments 1 and 2, results of experiments independently conducted by the present inventors and of computer simulations are described. It is noted that the numerical values and elements indicated here are merely examples, and the present invention is not necessarily limited to these numerical values and elements.

Figure 6:
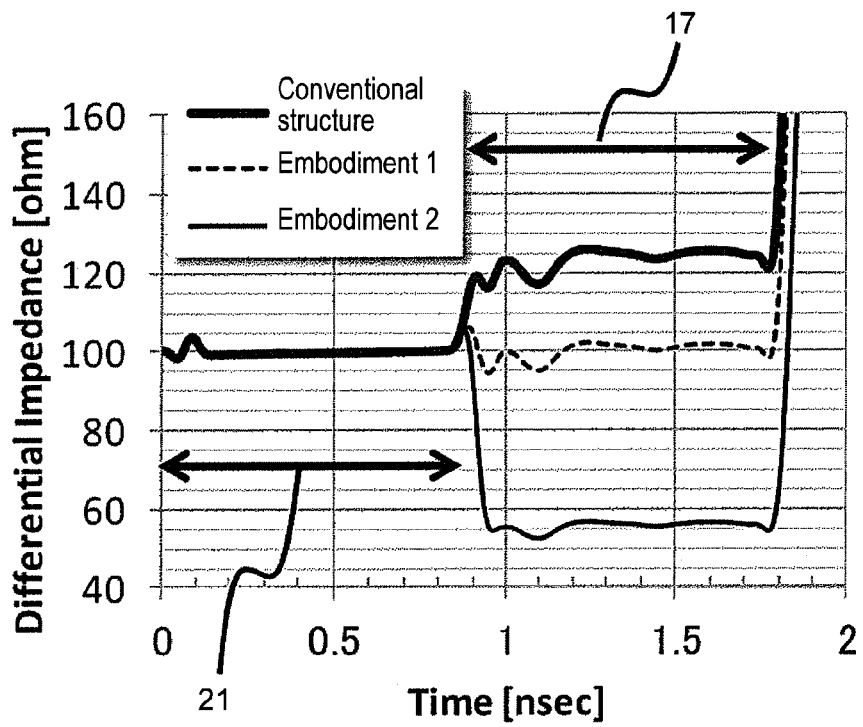
FIG. 6 is a chart showing the results of evaluating the characteristic impedance of a flexible flat cable 13 (lines 17) by itself.

FIG. 6 is a chart showing the results of evaluating the characteristic impedance of the flexible flat cable 13 (the lines 17) by itself. Here, flexible flat cables to be measured were connected to a coaxial cable 21 for measurement, and the characteristic impedance during differential transmission was evaluated using TDR (Time Domain Reflectometry). For purposes of comparison, the characteristic impedances of a conventional flexible flat cable and of the flexible flat cables 13 according to Embodiments 1 and 2 are presented alongside one another in FIG. 6.

In FIG. 6, the vertical axis represents characteristic impedance (Ω) during differential transmission, and the horizontal axis represents time. The measurement results from 0.0 nsec up to around 0.9 nsec indicate the differential characteristic impedance of the coaxial cable 21 for measurement. Since measurements were taken with the unconnected side of the coaxial cable 21 left open, the characteristic impedance values diverge after around 1.8 nsec.

As shown in FIG. 6, the characteristic impedance of the flexible flat cable having a conventional structure is approximately 120Ω. In contrast, the characteristic impedance of the flexible flat cable 13 of Embodiment 1 drops to approximately 100Ω. The characteristic impedance of the flexible flat cable 13 of Embodiment 2 drops further to approximately 60 Ω.

Next, the results of evaluating the differential passing characteristics (S-parameters) of the differential transmission lines 10 from the output end of the OEIC 6 on the first circuit board 12 within the optical pick up 2 up to the input end of the signal processing LSI 8 on the second circuit board 14 are described.

As it was decided that the evaluations above were to be carried out through computer simulation, a computer model was first created for the circuit configuration of from the output end of the OEIC 6 up to the input end of the signal processing LSI 8. Specifically, on a circuit simulator, the above-mentioned S-parameters, an equivalent circuit for the OEIC 6, and an equivalent circuit for the signal processing LSI 8 were created, and the transmission characteristics of the read signal transmission system were calculated. A conventional structure was employed for the differential transmission lines 10.

In the present simulation, the output impedance of the OEIC 6 during differential transmission was set to 80Ω, and the input impedance of the signal processing LSI 8 during differential transmission was set to 2000Ω. With respect to the bandwidth constraint of the OEIC 6 itself, only the CR constants contained in the equivalent circuit for the OEIC 6 were considered, and the response speed of the photodetector itself was disregarded. In other words, in the present simulation, only the electrical transmission characteristics of the read signal transmission system were evaluated.

Figure 7:
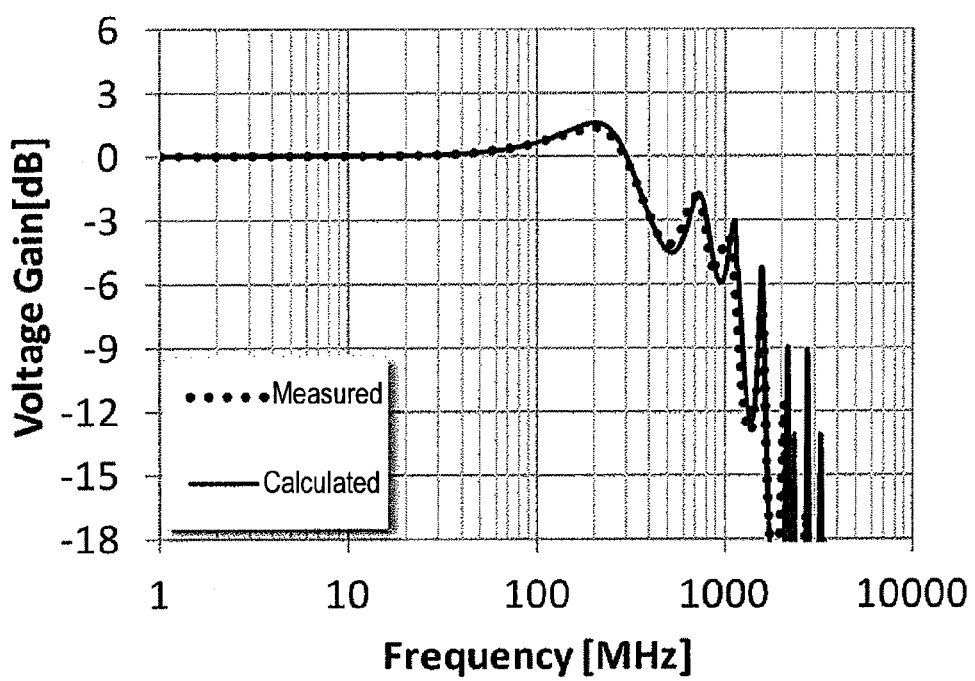
FIG. 7 shows the results of evaluating the transmission characteristics of a computer model with a circuit configuration of from the output end of the OEIC 6 to the input end of the signal processing LSI 8.

FIG. 7 shows the results of evaluating a computer model of a circuit configuration of from the output end of the OEIC 6 up to the input end of the signal processing LSI 8. As shown in FIG. 7, since the transmission characteristics of the computer model are in approximate agreement with the actual transmission characteristics, it can be seen that the computer model accurately reflects the actual circuit characteristics.

Figure 8:
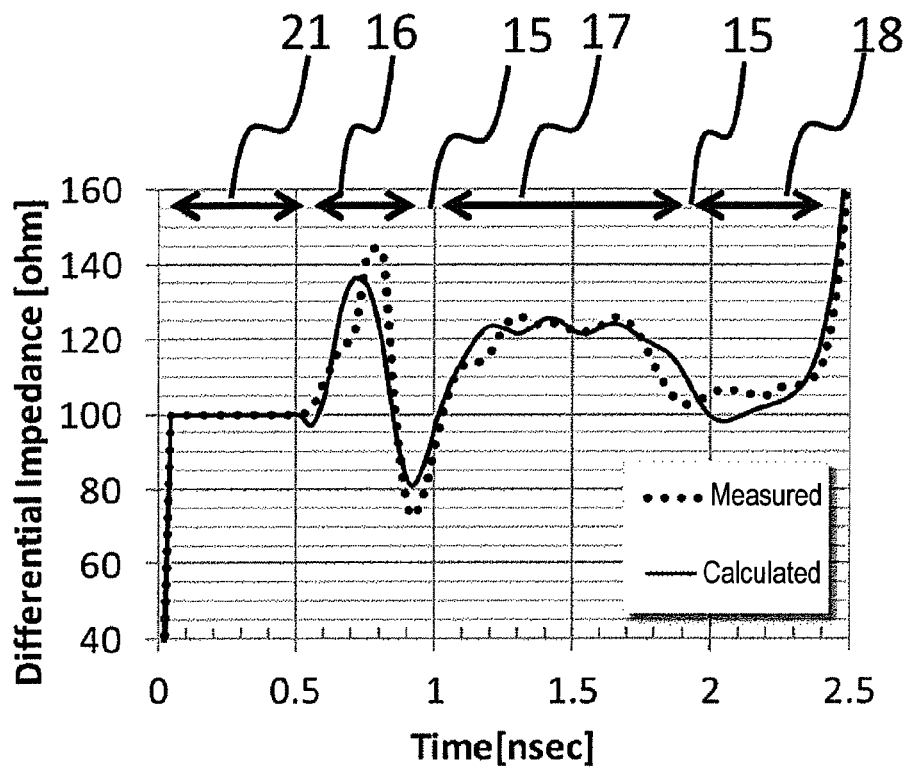
FIG. 8 shows the results of evaluating the characteristic impedance of the computer model shown in FIG. 7.

FIG. 8 shows the results of evaluating the computer model shown in FIG. 7 by TDR. As shown in FIG. 8, it can be seen that the characteristic impedance of the computer model is in close agreement with the measured characteristic impedance. The effects of Embodiments 1 and 2 are evaluated by simulation below using this computer model.

Figure 9:
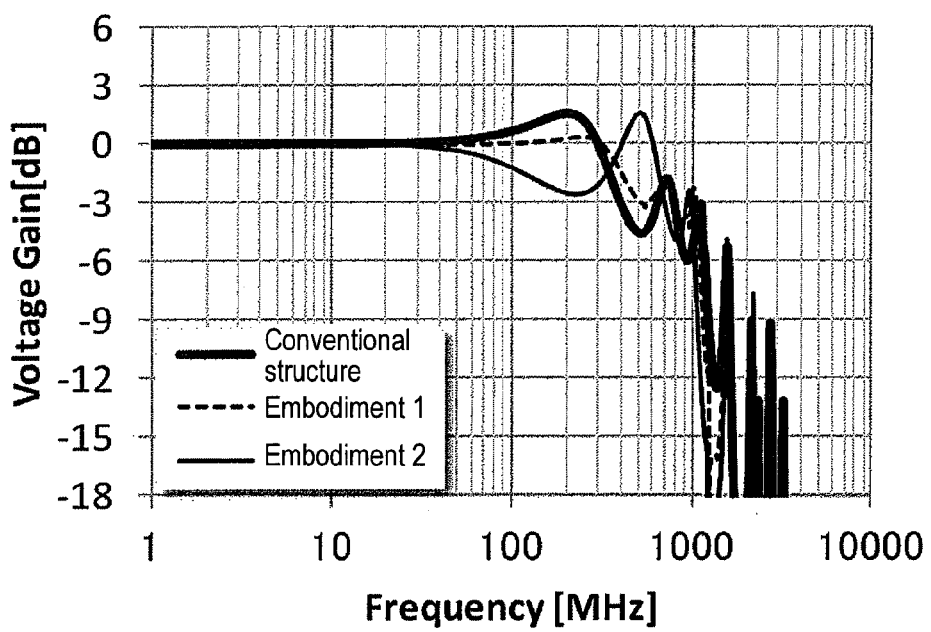
FIG. 9 shows the results of evaluating transmission characteristics with computer models of differential transmission lines 10 according to Embodiments 1 and 2 applied under the computer models shown in FIGS. 7 and 8.

FIG. 9 shows the results of evaluating transmission characteristics wherein computer models of the differential transmission lines 10 according to Embodiments 1 and 2 are applied under the computer model shown in FIGS. 7 and 8. The evaluation results shown in FIG. 9 are described below. It is noted that in the description below, whether or not the signal degradation via the differential transmission lines 10 is excessive is determined based on whether or not signal gain drops by 3 dB or more.

It can be seen that in Embodiment 1, the increase in gain near 200 MHz due to reflection is suppressed. In addition, whereas the frequency at which gain drops by 3 dB is around 400 MHz for the conventional flexible flat cable, this improves to around 500 MHz for Embodiment 1. In other words, it may be said that, with Embodiment 1, gain is less likely to drop even when signals are transmitted at higher frequencies.

In Embodiment 2, the roll-off from lower frequencies is greater, and the frequency at which gain drops by 3 dB is lower than that for the conventional flexible flat cable. It is speculated that this is due to the fact that the characteristic impedance of the flexible flat cable 13 has been lowered in excess. An explanation is provided with reference to FIG. 10.

Figure 10:
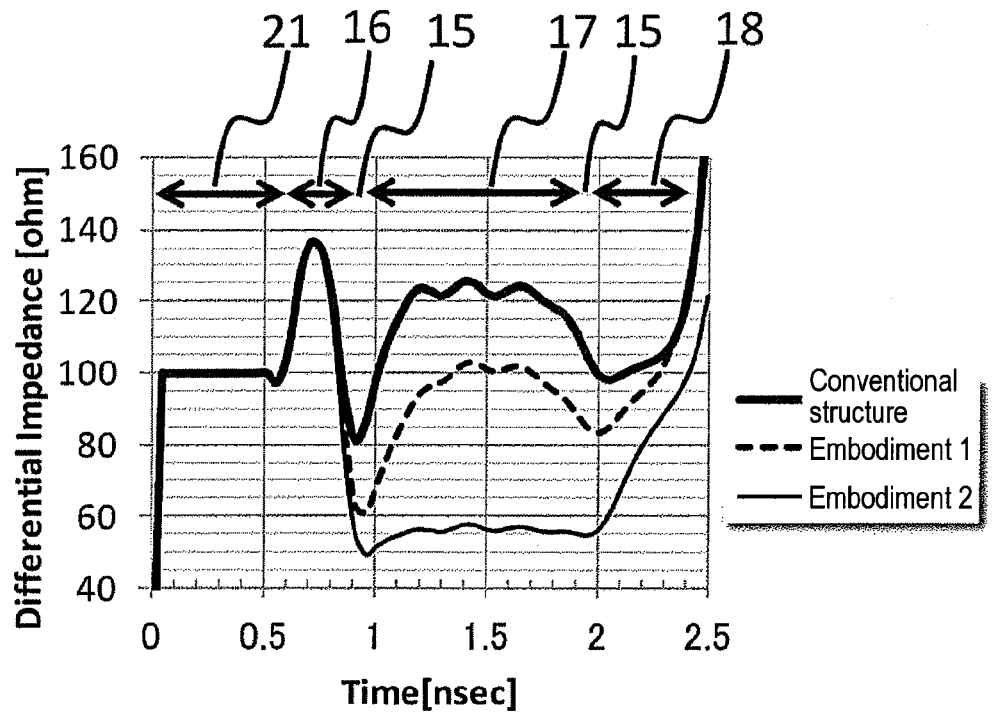
FIG. 10 shows the results from TDR measurements performed with computer models of the differential transmission lines 10 according to Embodiments 1 and 2 applied under the computer models shown in FIGS. 7 and 8.

FIG. 10 shows the results of obtaining TDR measurements by applying the computer models for the differential transmission lines 10 according to Embodiments 1 and 2 under the computer model shown in FIGS. 7 and 8. The measurement results shown in FIG. 10 are discussed below.

When the conventional flexible flat cable is used, the characteristic impedance is around 120Ω, resulting in a mismatch between the average impedance of the read signal transmission line as a whole and the output impedance of the OEIC 6.

In Embodiment 1, the characteristic impedance of the flexible flat cable 13 drops to around 100Ω, and the average impedance of the read signal transmission line as a whole approaches the output impedance of the OEIC 6, namely 80Ω. Thus, the impedance matching condition is improved, and transmission characteristics improve as shown in FIG. 9.

In Embodiment 2, the characteristic impedance of the flexible flat cable 13 drops to around 60Ω, and the average impedance of the read signal transmission line as a whole drops past the output impedance of the OEIC 6, namely 80Ω. Thus, the impedance matching condition does not improve significantly, and transmission characteristics deteriorate as shown in FIG. 9.

Figure 11:
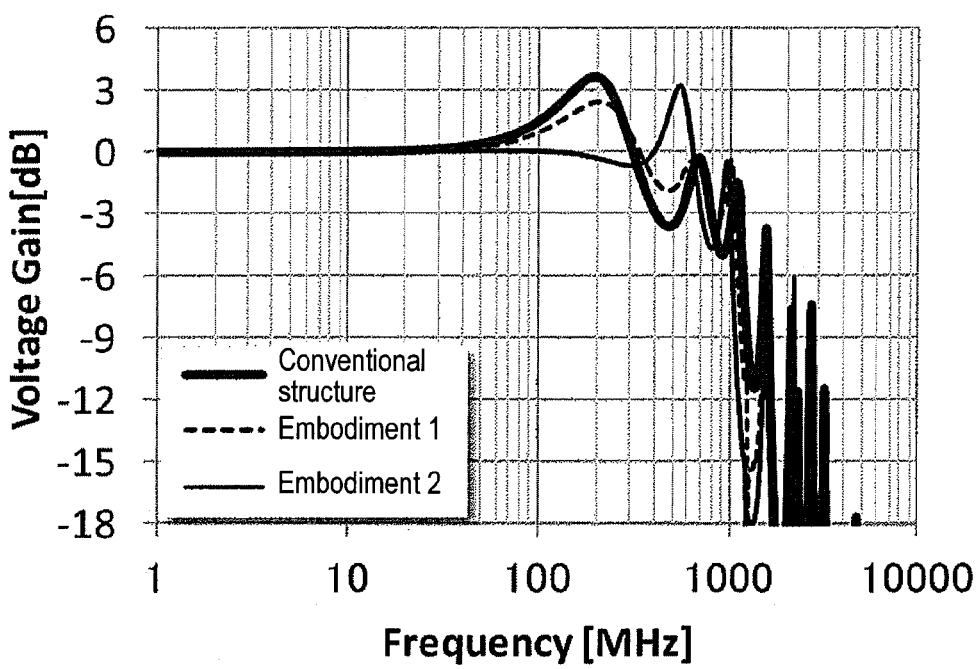
FIG. 11 shows the results of evaluating transmission characteristics in a similar manner to FIG. 9, where the output impedance of the OEIC 6 during differential transmission is set to 60 Ω.

FIG. 11 shows the results of evaluating transmission characteristics in a similar manner to FIG. 9, but with the output impedance of the OEIC 6 during differential transmission set to 60Ω. The evaluation results shown in FIG. 11 are discussed below.

In Embodiment 2, the frequency at which gain drops by 3 dB increases to around 600 MHz, and transmission characteristics improve as compared to FIG. 9. In contrast, with the conventional flexible flat cable and Embodiment 1, the increase in gain around 200 MHz is greater than in FIG. 9, as a result of which waveform ringing becomes greater. This is due to the fact that the characteristic impedance of the differential transmission line 10 and the output impedance of the OEIC 6 do not match.

Figure 12:
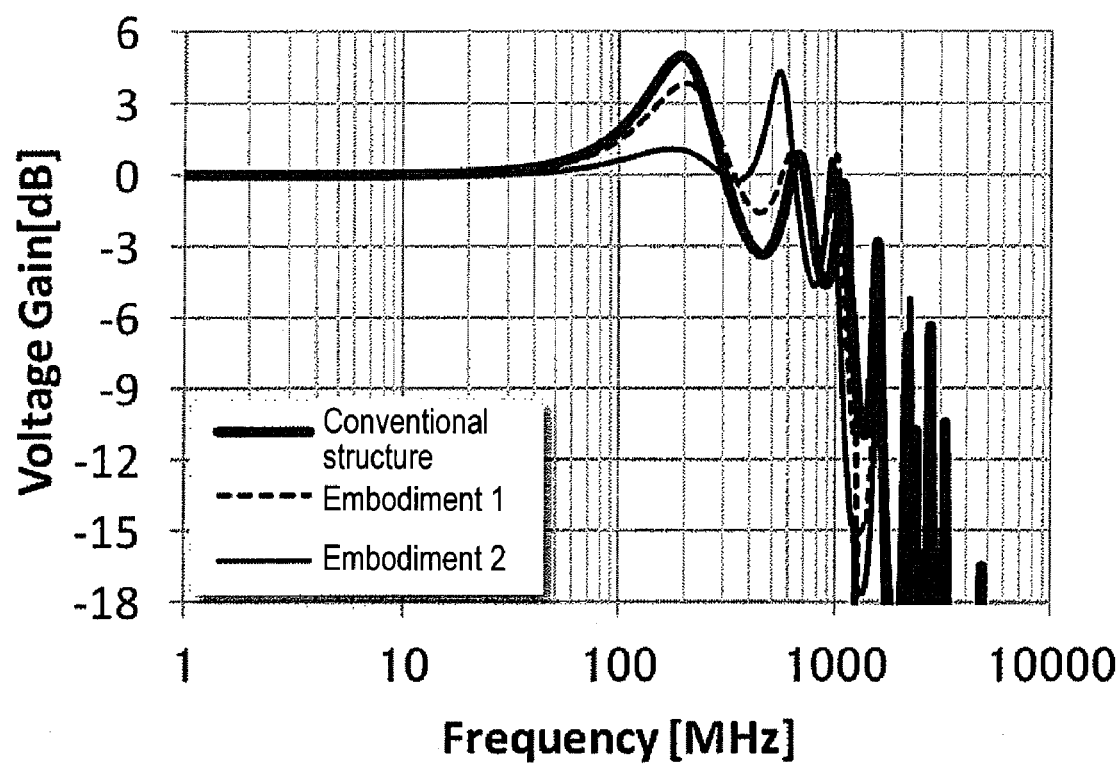
FIG. 12 shows the results of evaluating transmission characteristics in a similar manner to FIG. 9, where the output impedance of the OEIC 6 during differential transmission is set to 50 Ω.

FIG. 12 shows the results of evaluating transmission characteristics in a similar manner to FIG. 9, but with the output impedance of the OEIC 6 during differential transmission set to 50Ω. In this chart, increases in gain can be seen around 200 MHz for the conventional flexible flat cable, and both of Embodiments 1 and 2, as a result of which waveform ringing becomes greater.

Comparing FIGS. 11 and 12, it can be seen that in Embodiment 2, about 60Ω is most suitable for the output impedance of the OEIC 6 during differential transmission, and that an OEIC with a lower output impedance than is conventional can be used.

EMBODIMENT 3

Figure 13:
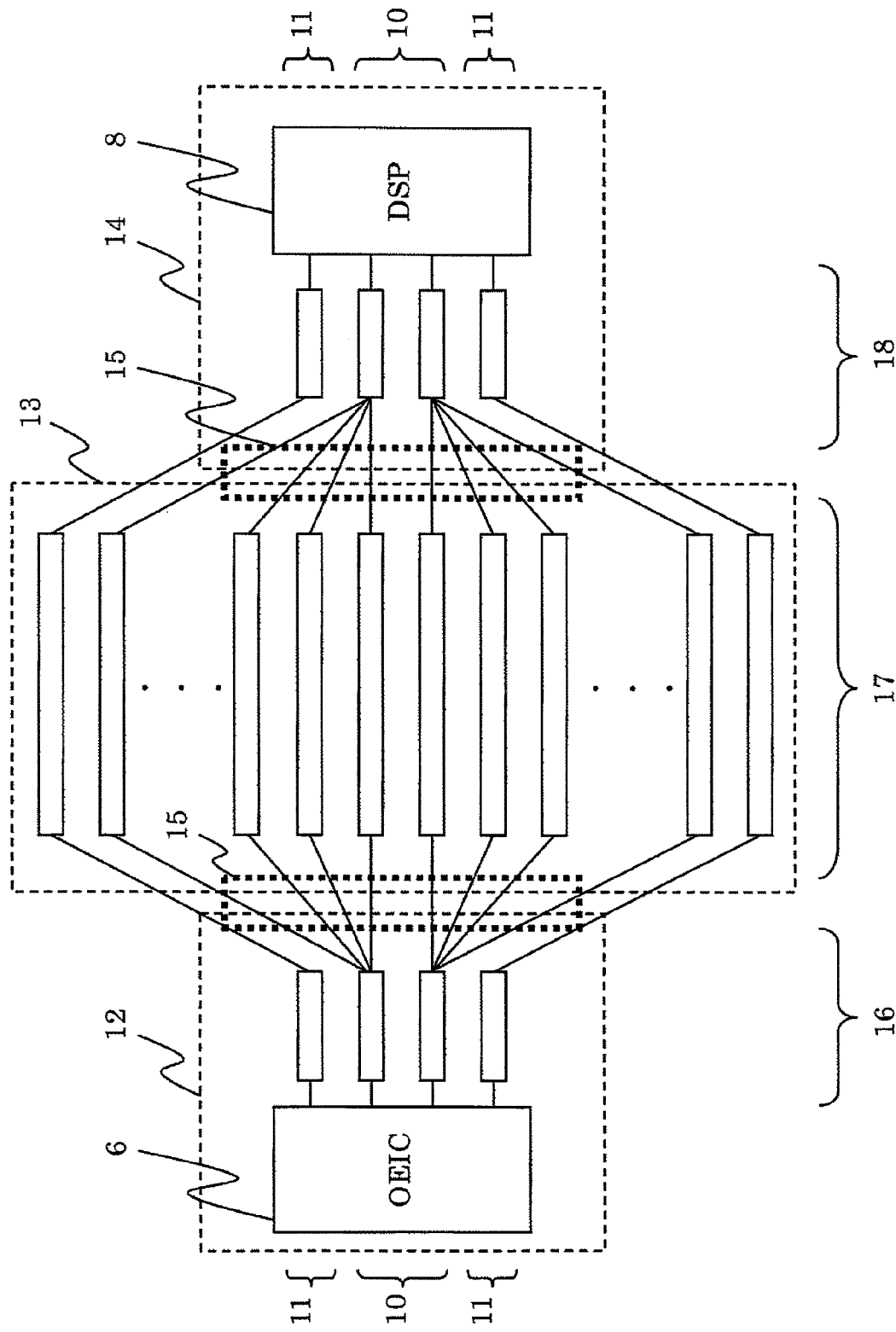
FIG. 13 is a configuration diagram of an optical disc drive according to Embodiment 3.

FIG. 13 is a configuration diagram of an optical disc drive according to Embodiment 3 of the present invention. As in FIG. 3, only elements of the read signal transmission line are shown in this diagram, while other general elements are omitted.

In Embodiment 3, the two lines forming the differential transmission lines 10 are each divided into n lines (where $n \geq 3$) near the connection point between the first circuit board 12 and the flexible flat cable 13. The divisional lines are reintegrated into one line near the connection point between the second circuit board 14 and the flexible flat cable 13. The configuration is otherwise similar to that of Embodiment 1.

In Embodiment 3, the line width of the differential transmission lines 10 is wider than in Embodiment 1. Consequently, the inductance component of the differential transmission lines 10 per unit length becomes lower than that in Embodiment 1. Thus, since the characteristic impedance of the differential transmission lines 10 becomes lower than that in Embodiment 1, the output impedance of the OEIC 6 may be further lowered and still be matched with the characteristic impedance of the differential transmission lines 10. It is thus possible to further improve bandwidth.

EMBODIMENT 4

Figure 14:
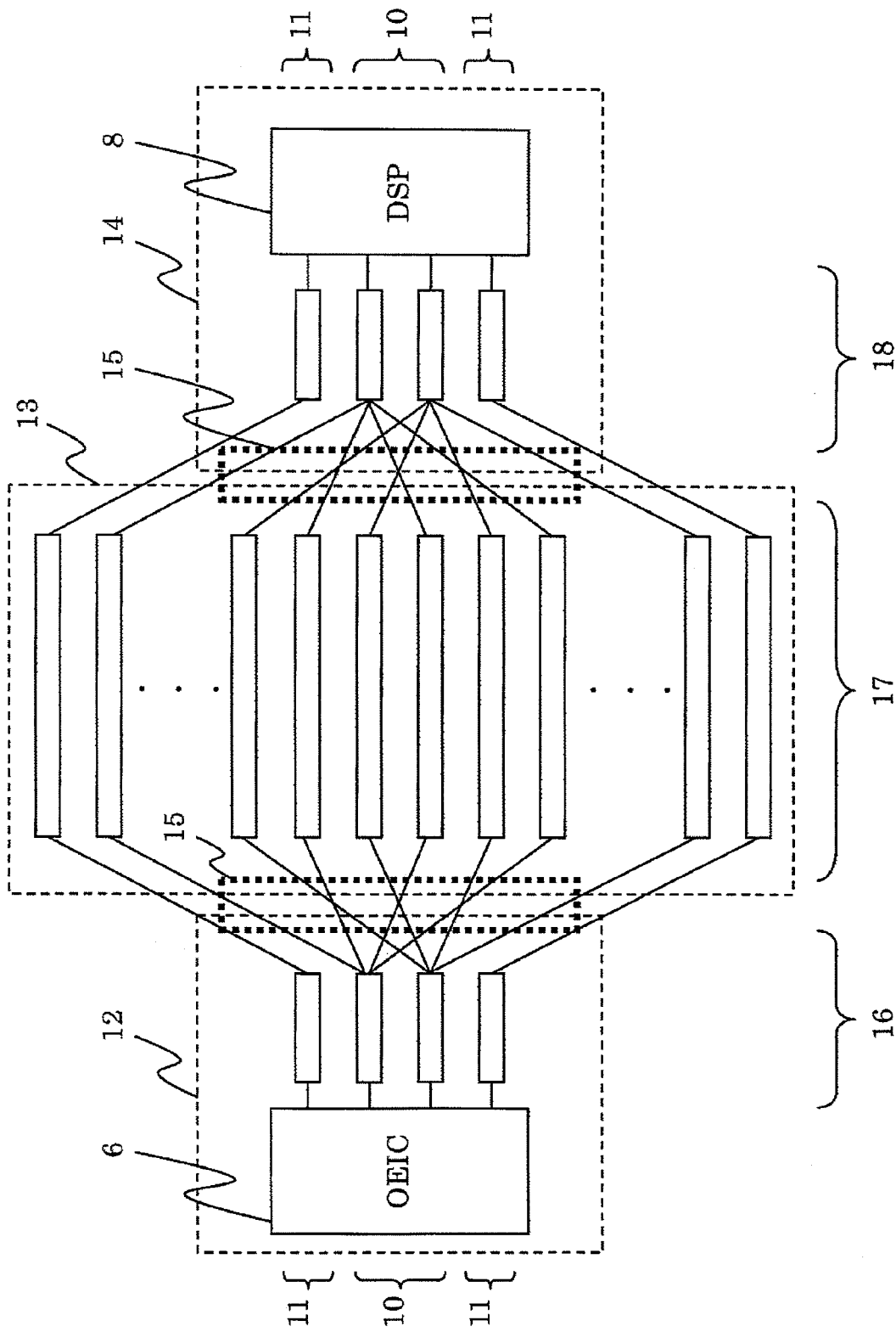
FIG. 14 is a configuration diagram of an optical disc drive according to Embodiment 4.

FIG. 14 is a configuration diagram of an optical disc drive according to Embodiment 4 of the present invention. As in FIG. 3, only elements of the read signal transmission line are shown in this diagram, while other general elements are omitted.

In Embodiment 4, the two lines forming the differential transmission lines 10 are each divided into n lines (where $n \geq 3$) near the connection point between the first circuit board 12 and the flexible flat cable 13 and are arranged in such a manner that antiphase differential signals are alternatingly adjacent to one another. The divisional lines are reintegrated into one line near the connection point between the second circuit board 14 and the flexible flat cable 13. The configuration is otherwise similar to that of Embodiment 2.

In Embodiment 4, there are (2n−1) sections in which antiphase lines are adjacent to each other. Consequently, there are also (2n−1) capacitive couplings among the lines. As a result, compared to Embodiment 3, the capacitive coupling component of the flexible flat cable 13 increases, and the characteristic impedance of the differential transmission lines 10 drops further. Thus, since the output impedance of the OEIC 6 may be further lowered and still be matched with the characteristic impedance of the differential transmission lines 10, it is possible to further improve bandwidth.

EMBODIMENT 5

Figure 15:
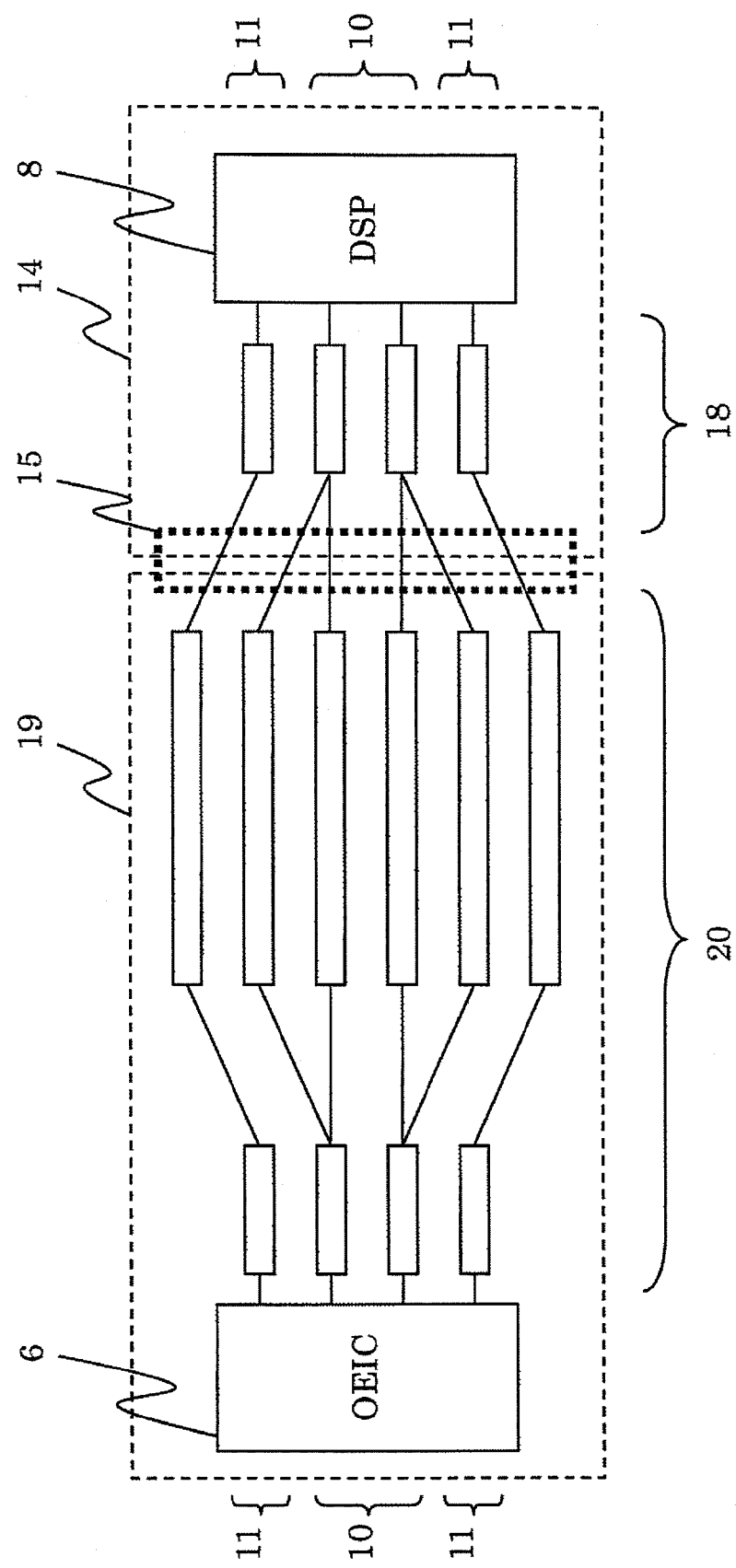
FIG. 15 is a configuration diagram of an optical disc drive according to Embodiment 5.

FIG. 15 is a configuration diagram of an optical disc drive according to Embodiment 5 of the present invention. As in FIG. 3, only elements of the read signal transmission line are shown in this diagram, while other general elements are omitted.

In Embodiment 5, the first circuit board 12 and the flexible flat cable 13 found in each of Embodiments 1 to 4 are integrally configured on a flexible printed circuit 19. Thus, lines 16 and 17 are integrated as line 20. It is noted that FIG. 15 shows, by way of example, a configuration comprising divisional lines similar to those in Embodiment 1. However, the divisional lines of the other embodiments may also be mounted on the flexible printed circuit 19 in a manner similar to FIG. 15.

A configuration according to Embodiment 5 is capable of producing effects similar to those of Embodiments 1 to 4. It is noted that, with respect to Embodiment 5, the position at which the differential transmission lines 10 are divided should preferably be as close to the OEIC 6 as possible. Similarly, the position at which the divisional differential transmission lines 10 are reintegrated should preferably be as close to the connector 15 as possible.

A configuration in which the first circuit board 12 and the flexible lines are integrated as shown in FIG. 15 is employed in slim-type optical disc drives that are used for laptop personal computers, etc. According to Embodiment 5, effects similar to those of Embodiments 1 to 4 may be attained with such slim-type optical disc drives as well.

It is noted that it is also possible to have only a part of the first circuit board 12 be configured with a flexible printed circuit.

EMBODIMENT 6

With Embodiment 6, there is discussed a method of improving impedance matching conditions by innovating at least either of the stack structure of the first circuit board 12 and the stack structure of the second circuit board 14. The configuration is otherwise similar to those in Embodiments 1 to 5.

Figure 16:
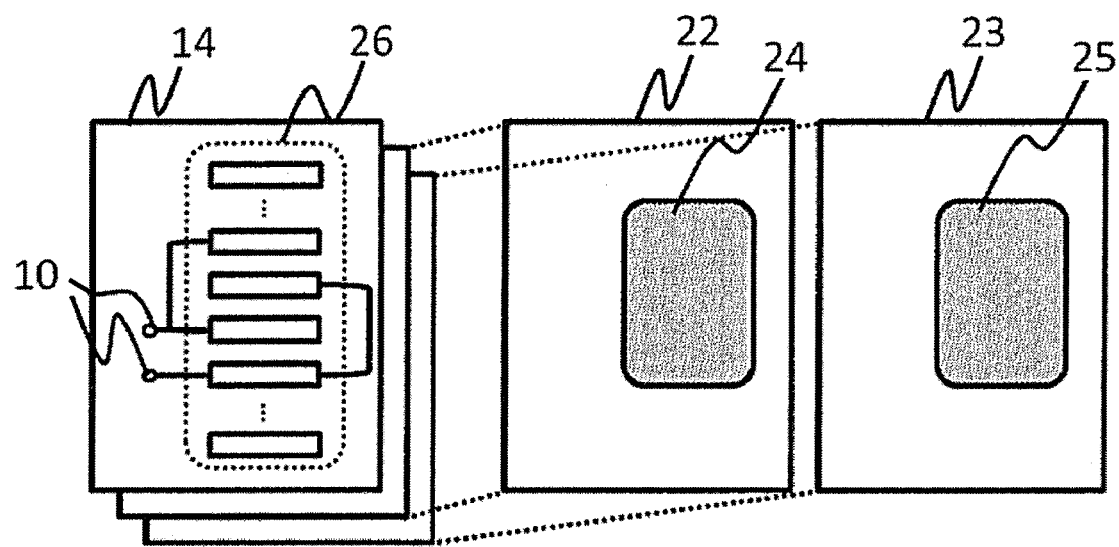
FIG. 16 is a configuration diagram of an optical disc drive according to Embodiment 6.

FIG. 16 is a configuration diagram of an optical disc drive according to Embodiment 6 of the present invention. Although only the stack structure of the second circuit board 14 is shown in this diagram, the first circuit board 12 may also comprise a similar configuration to the one shown in FIG. 16.

The second circuit board 14 comprises a layer in which the connector 15 for connecting the circuit board and the flexible flat cable 13 is arranged, and a second layer 22 and third layer 23 in which conductor patterns forming lines within the circuit board are arranged.

Generally, the connector 15 is affixed to the circuit board via a connection pad 26. In order to improve the strength of the circuit board, a member, such as a reinforcing metal plate, etc., is sometimes provided where the connection pad 26 is located.

The connection pad 26 is configured with a land of a relatively wide width as compared to the differential transmission lines 10. Thus, when the above-mentioned conductor patterns and reinforcing metal plate are placed directly below the connection pad 26, the capacitive coupling between them and the connection pad 26 becomes greater, and the drop in impedance near the connection pad 26 becomes greater.

In the configurations described with respect to Embodiments 1 to 5, inasmuch as there is an increase in the number of lines, both the number of connection pads connecting the differential transmission lines 10 and the first circuit board 12 as well as the number of connection pads connecting the differential transmission lines 10 and the second circuit board 14 also increase as compared to conventional flexible lines (to twice as many in the examples for Embodiments 1 and 2). Thus, the impedance near the connection pad 26 for each circuit board drops significantly, and signal reflection due to an impedance mismatch occurs, thereby adversely affecting read signal transmission.

As such, in Embodiment 6, the above-mentioned conductor patterns and reinforcing metal plate are not placed at parts of the second layer 22 and third layer 23 that fall directly below the connection pad 26. Specifically, the above-mentioned conductor patterns and reinforcing metal plate are not placed at a part 24 of the second layer 22 directly underneath the connection pad, nor at a part 25 of the third layer 23 directly underneath the connection pad.

According to Embodiment 6, it is possible to mitigate the capacitive coupling between the connection pad 26 and the conductor patterns or the reinforcing metal plate, and to suppress the drop in impedance. Thus, it is possible to prevent impedance mismatches, mitigate the reflection of read signals, and to improve transmission quality.

LIST OF REFERENCE NUMERALS

1: Optical disc
2: Optical pick up
3: Semiconductor laser diode (LD)
4: Laser beam
5: Read optical signal
6: OEIC
7: Read signal
8: Signal processing LSI
10: Differential transmission line
11: Guard line
12: First circuit board
13: Flexible flat cable
14: Second circuit board
15: Connector
16-18: Line
19: Flexible printed circuit
20: Line
21: Coaxial cable
22: Second layer
23: Third layer
24-25: Part directly underneath connection pad
26: Connection pad

What is claimed is:

1. An optical disc drive with a function for reading data from an optical disc using a laser beam, the optical disc drive comprising:

a photodetector that converts a reflected laser beam from the optical disc into an electrical signal;

a signal processing part that processes a signal outputted by the photodetector; and a differential transmission line that performs differential transmission of a signal between the photodetector and the signal processing part, wherein the differential transmission line comprises, at least at one part, a flexible line part that is configured in such a manner as to be capable of changing its shape, each line forming the differential transmission line is divided into a plurality of divisional lines of the same quantity, the quantity being two or more, at or near a connection point between the flexible line and the photodetector, and the plurality of divisional lines are integrated as one line at or near a connection point between the flexible line and the signal processing part.

2. An optical disc drive according to claim 1, wherein the plurality of divisional lines are arranged in such a manner that lines through which differential signals of the same phase are transmitted are adjacent to one another.

3. An optical disc drive according to claim 1, wherein the plurality of divisional lines are arranged in such a manner that lines through which differential signals of opposite phases are transmitted are alternatingly adjacent to one another.

4. An optical disc drive according to claim 1, further comprising:

a first circuit board on which the photodetector is mounted; and a second circuit board on which the signal processing part is mounted, wherein the flexible line is connected to the photodetector via the first circuit board, and is connected to the signal processing part via the second circuit board, and at least one of the first circuit board and the second circuit board is configured in such a manner that at least one of a conductor pattern forming a part of the circuit board and a reinforcing metal plate that reinforces a connection part is not located at a part beneath a connector that connects with the flexible line.

5. An optical disc drive according to claim 1, wherein the flexible line is configured using a flexible flat cable.

6. An optical disc drive according to claim 1, wherein the flexible line is configured using a flexible printed circuit.

7. An optical disc drive according to claim 1, further comprising a first circuit board on which the photodetector is mounted, wherein the first circuit board is configured using at least one of a flexible printed circuit and a printed circuit board.

8. An optical disc drive according to claim 1, further comprising a first circuit board on which the photodetector is mounted, wherein the first circuit board and the flexible line are integrally configured on a flexible printed circuit, and each line forming the differential transmission line is divided near the photodetector.

9. An optical disc drive according to claim 1, wherein a guard line that suppresses noise is provided adjacent to and on an outer side of the differential transmission line.

* * * * *